J. F. HALSTEAD.
TAPPING ATTACHMENT FOR BORING MACHINES.
APPLICATION FILED APR. 21, 1917.

1,260,896.

Patented Mar. 26, 1918.
2 SHEETS—SHEET 1.

INVENTOR
John F. Halstead
BY
Sydney L. Prescott
ATTORNEY

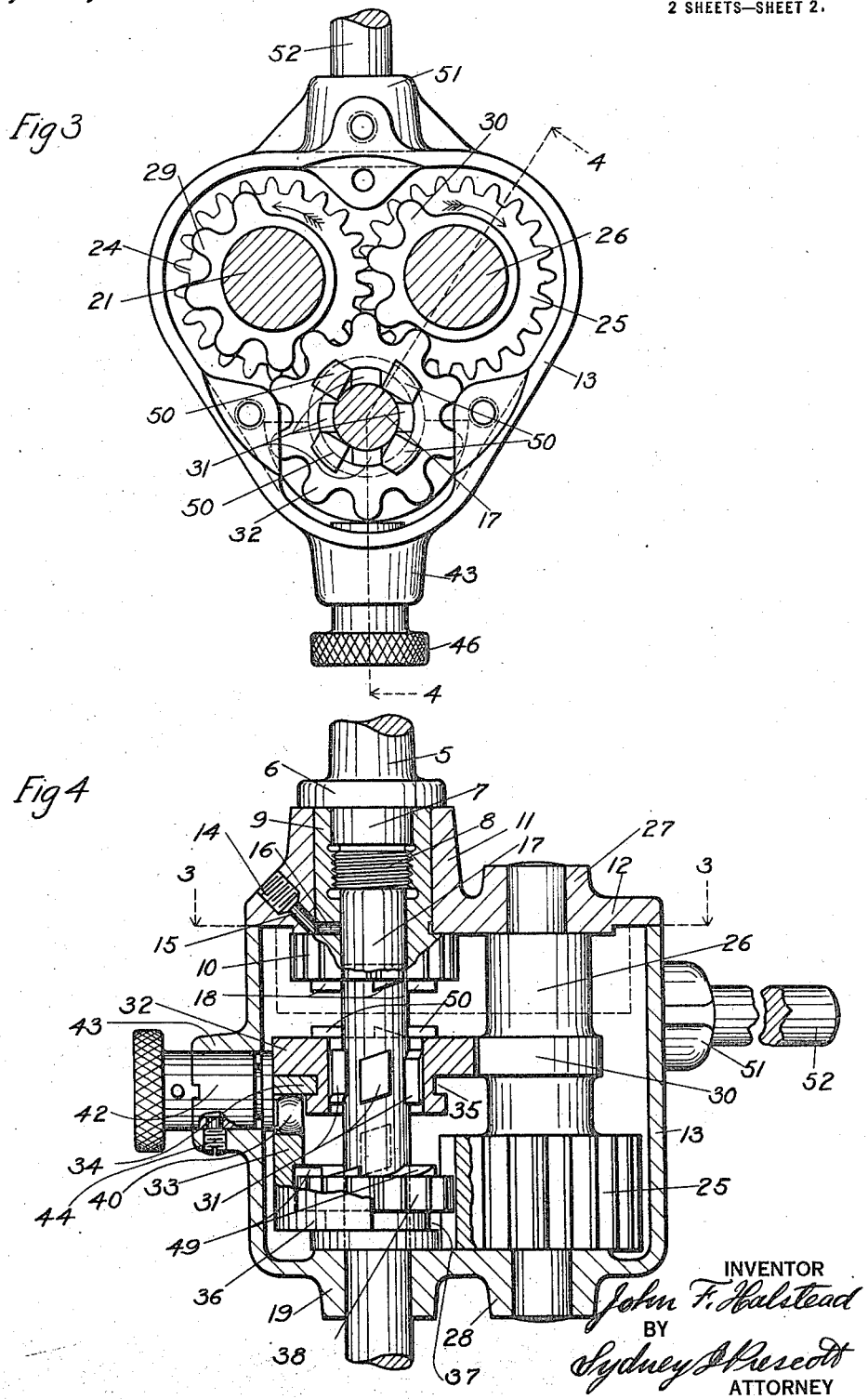

UNITED STATES PATENT OFFICE.

JOHN F. HALSTEAD, OF BROOKLYN, NEW YORK, ASSIGNOR TO WAHLSTROM TOOL COMPANY, OF NEW YORK, N. Y., A CORPORATION OF NEW YORK.

TAPPING ATTACHMENT FOR BORING-MACHINES.

1,260,896.   Specification of Letters Patent.   Patented Mar. 26, 1918.

Application filed April 21, 1917. Serial No. 163,558.

*To all whom it may concern:*

Be it known that I, JOHN F. HALSTEAD, a citizen of the United States, residing at Brooklyn, county of Kings. and State of New York, have invented a new and useful Improvement in Tapping Attachments for Boring-Machines, of which the following is a specification.

This invention relates to an improvement in tapping attachments for boring machines and it has for its main object the production of a device of this general character capable of use for tapping holes in material differing in its resistance to a tapping operation, such for instance as in cast iron, steel, and other relatively soft or hard materials. Another object is the production of a device which is simple, durable, compact and highly efficient for the purposes intended. With these and other objects not specifically mentioned, the invention consists in certain parts, constructions and combinations which will be hereinafter fully described and then specifically pointed out in the claims hereunto appended.

Figure 1:
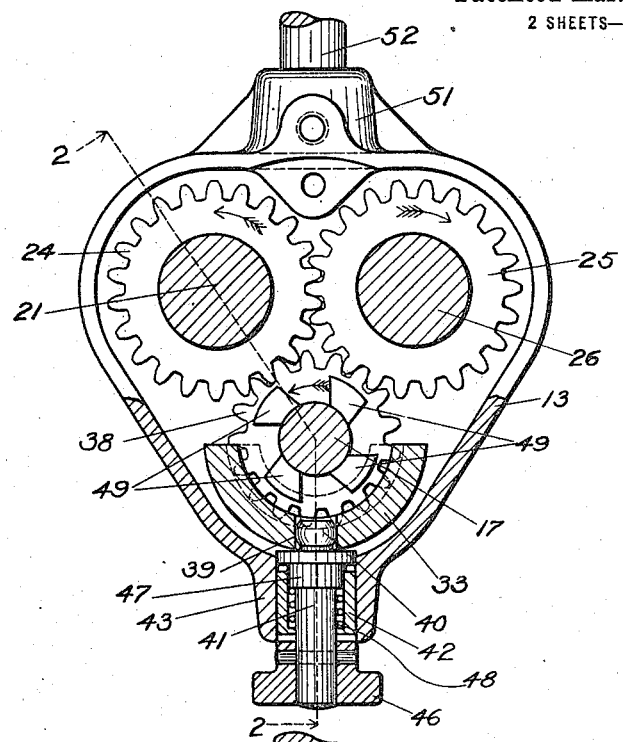
Figure 2:
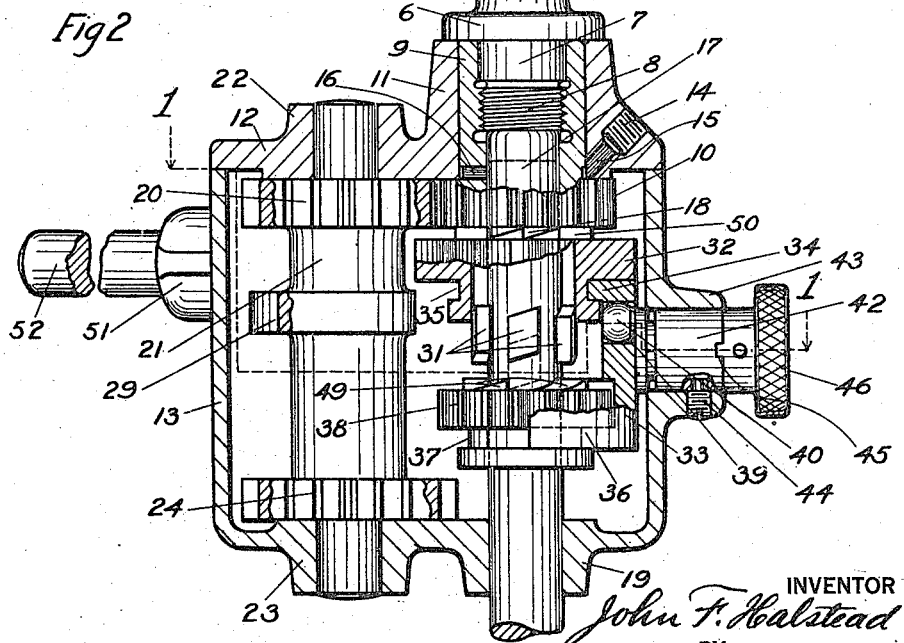

In the accompanying drawings, which form a part of this specification and in which like characters of reference indicate the same or like parts, Figure 1 is a plan view of a structure constructed in accordance with the invention with certain parts removed and other parts shown in section, the section being taken on the line 1—1 in Fig. 2; Fig. 2 is a sectional elevation of the structure shown in Fig. 1 taken on the line 2—2 in Fig. 1; Fig. 3 is a sectional view of the same structure taken on the line 3—3 in Fig. 4; and Fig. 4 is a sectional view taken on the line 4—4 in Fig. 3.

In carrying the invention into effect there is provided a driving spindle, a driven spindle, and mechanism comprising a pair of oppositely rotating countershafts provided with alternately acting interrupted gears of different effective amplitude, and an operating gear for oscillating the driven spindle, the function of this structure being the production of an oscillatory movement of the driven spindle and a tap supported thereby, the forward oscillations being in excess of the backward oscillations, so that the tap will be cleared of chips when operating in a hard substance such as steel. In certain constructions, there is further provided one-way driving connections for said spindles and means for shifting the operating gear from engagement with the interrupted gears into position to cause the operation of the one-way driving connections, the function of this additional structure being to cause the rotation of the driven spindle—and a tap carried thereby—in one direction, when the tap is working in a relatively soft material such as cast iron which does not require oscillation of the driven spindle and the tap to clear the tap of chips.

In the best constructions, there is further provided means for moving the operating gear into and out of engagement with the interrupted gears, and the rotating countershafts derive their motion directly from the driving spindle. In the best constructions also the interrupted gears are operative in the same planes and are located between the countershaft ends and are integral with said shafts. In the best constructions also, the one-way driving means comprises a clutch member driven by the driving spindle and a coöperating clutch member carried by the operating gear. Tap withdrawing means are also provided, and in the best constructions this tap withdrawing means comprises a reverse running device having a clutch member formed thereon and a coöperating clutch member carried by the driven spindle. In the best constructions also, the driven spindle is provided with a plurality of splines and the rotation of the spindle is effected by means engaging said splines, and additional means are provided for engaging said splines to reverse the rotation of said spindle to cause the withdrawal of a tap. In the best constructions also, means are provided for maintaining a constant spaced relation between the rotating means for the driven spindle and the reverse running means for causing the withdrawal of a tap. All of the above means, mechanism, devices and parts may be varied in construction within wide limits without departing from the scope of the claims.

The structure selected to illustrate the invention is but one of many possible concrete embodiments of the same, and the invention therefore is not to be restricted to the precise details of the structure shown and described. Furthermore, certain parts of the structure are capable of use independent of other parts, and such independent use is contemplated.

Referring to the drawings, 5 indicates a driving spindle having a tapered shank whereby it may be connected to a boring machine from which it derives its motion. The driving spindle 5 is provided with a flange 6 and a reduced end 7, beyond which there is a further reduced end provided with a thread and marked 8. The end 8 is threaded into the hub 9 of a gear 10, the hub being journaled in a boss 11 rising from a plate 12 which forms the cover of a casing 13, which casing incloses the major part of the mechanism to be hereinafter described. The threaded connection of the end 8 of the hub 9 and the bearing of the flange 6 upon the end of said hub insures the rotation of the gear 10 with the driving spindle 5, and the flange 6 and the gear 10 bearing upon the ends of the hub 11 serve to retain the parts in proper relation for operation. The threaded hole 14 in the cover 12 is provided, and in this hole an oil cup may be screwed. A hole 15 running from the bottom of the threaded hole 14 serves as a conduit for oil, and a hole 16 bored in the hub 9 serves as an oil conduit leading to an aperture on the axis of the hub 9 and gear 10, in which the upper end of a driven spindle 17 is mounted to rotate and to slide. The lower face of the gear 10 is provided with integral clutch members 18, the purpose of which will be hereinafter described. The driven spindle 17 is also journaled in a hub 19 formed in the bottom of the casing 13 before referred to. The driven spindle projects below the casing and upon the projecting end may be secured a chuck which in turn will support a tap.

Meshing with the gear 10 is a gear 20 formed integrally upon a countershaft 21, which countershaft is journaled in a boss 22 formed on the cap 12 before referred to, and in a boss 23 formed on the bottom of the casing 13. This countershaft 21 is further provided with an integral gear 24 adjacent the boss 23, and the gear 24 is in mesh with a wide face gear 25 formed integrally on a second countershaft 26, which second countershaft is journaled in a boss 27 formed on the cap 12 and in a boss 28 formed on the bottom of the casing 13. The gear 10 rotates continuously and it will be readily understood that through the connections just described, the countershafts 21 and 26 will be constantly rotated in opposite directions.

Between the ends of the countershaft 21 is an integral interrupted gear 29 having five teeth representing its effective amplitude. Similarly, the countershaft 26 is provided, between its ends and in the same planes as the interrupted gear 29, with an integral interrupted gear 30 having three teeth representing its effective amplitude.

The driven spindle 17 is provided with four splines 31 and mounted upon said spindle and in engagement with these splines is an operating gear 32 adapted for intermittent engagement with the interrupted gears 29 and 30. By an inspection of Fig. 3, it will be readily understood that the operating gear 32, and consequently the driven spindle 17, will—when the operating gear is in the same planes as the interrupted gears—be oscillated by the alternately acting interrupted gears 29 and 30, and that the forward oscillations will be in excess of the backward oscillations. As before stated, means are provided for moving the operating gear into and out of position to be actuated by the interrupted gears 29 and 30. In the device selected to illustrate the invention, this moving means includes a yoke 33 provided with an upper flange 34 engaging a groove 35 formed in the operating gear 32, and with a lower flange 36 engaging a groove 37 formed upon a gear 38 which is in mesh with the wide face gear 25 and therefore runs continuously in a direction reverse to that of the driving spindle 5. It will be readily understood that this yoke with its flanges engaging the operating gear 32 and the reverse running gear 38 serves to maintain the two gears in constant spaced relation whatever the general position of the yoke may be. The yoke is provided with an aperture 39 and in this aperture is located a shifting ball 40. The ball 40 is eccentrically mounted on a short shaft 41 journaled in the sleeve 42, which sleeve is supported by a boss 43 formed on one side of the casing 13. The sleeve 42 is held against rotation in the boss by means of a set screw 44. The sleeve is further provided with a notch 45 and this notch is engaged by a corresponding projection on a thumb nut 46 pinned to the shaft 41. The shaft 41 is provided with an enlarged head 47 against which bears one end of a spring 48, the other end of the spring bearing against the bottom of a suitable aperture in the sleeve 42. By an inspection of Figs. 1 and 2, it will be readily understood that the thumb nut 46 may be seized and pulled out against the action of the spring 48, whereupon the shaft 41 may be rotated to shift the position of the ball 40, and consequently to shift the position of the yoke 33.

The lower ends of the splines 31 serve as clutch members carried by the driven spindle, and the reverse running gear 38 is provided upon its upper face with clutch members 49.

The upper surface of the operating gear 32 is provided with clutch members 50 adapted for coöperation with the clutch members 18 formed on the gear 10.

The casing 13 is provided with a boss 51 in which is secured a bar 52, by means of which rotation of the casing is prevented when the device is in operation.

When the device is to be used for tapping in a soft material such as cast iron, the one-way driving means are used and the oscillating connections are thrown out of action. Fig. 2 illustrates the parts in the position in which they will operate when the device is used for tapping soft material. By an inspection of this figure, it will be seen that the clutch members 18 and 50 are in engagement, and that the operating gear is moved up out of the planes of the interrupted gears 29 and 30 and out of the range of action thereof. The clutch members 18 and 50 will therefore coöperate to rotate the operating gear 32 continuously in the same direction as that of the driving spindle 5, and the operating gear 32 by means of its engagement with the splines 31, (which though limited is sufficient to transmit the necessary power when operating in soft material), will cause a like rotation of the driven spindle 17 and the tap carried thereby. When the tapping operation is complete; that is to say, when the tap reaches the bottom of the tap hole, the whole device is lifted by the lifting bar of the boring machine, not shown. This results in lifting the casing 13 and all of the mechanism therein except the driven spindle 17 which of course cannot be so lifted because of the threaded engagement of the tap in the work. The result of this lifting action is the disengagement of the driven spindle splines 31 from the operating gear 32 and their engagement as clutch members with the clutch members 49 of the reverse running gears 38, the relative position of the splines and upper end of the driven spindle at this time being shown in Fig. 2 by the dotted lines. As soon as this clutch engagement occurs, the motion of the driven spindle will be reversed by the action of the reverse running gear 38 and the tap will be withdrawn from the work.

When the device is to be used in tapping holes in hard materials such as steel, the yoke 33 is shifted to the position shown in Fig. 4, which brings the operating gear 32 into the planes of the interrupted gears 29 and 30 and disengages the clutch members 18 and 50. When the operating gear is in this position, its full engagement with the driven spindle splines 31 will cause the oscillation of the said spindle, the forward oscillations being in excess of the backward oscillations. When the tapping operation is complete, the whole device is lifted as in the case where the one-way driving connections are used. This lifting action results in bringing the splines 31 and the upper end of the driven spindle 17 to the position shown by dotted lines in Fig. 4. It will be noted that this movement completely disengages the splines from the operating gear 32 and that the driven spindle becomes clutched to the reverse running gear 38, which in turn results in withdrawing the tap as in the case where the one-way driving connections are used.

What is claimed is:

1. In a tapping attachment for boring machines, the combination with a driving spindle, of a driven spindle, and mechanism comprising a pair of oppositely rotating countershafts provided with alternately acting interrupted gears of different effective amplitude and an operating gear for oscillating the driven spindle.

2. In a tapping attachment for boring machines, the combination with a driving spindle, of a driven spindle, mechanism comprising a pair of oppositely rotating countershafts provided with alternately acting interrupted gears of different effective amplitude and an operating gear for oscillating the driven spindle, and means for moving the operating gear into and out of engagement with the interrupted gears.

3. In a tapping attachment for boring machines, the combination with a driving spindle; of a driven spindle, mechanism comprising a pair of oppositely rotating countershafts intergeared and geared to the driving spindle and provided with alternately acting interrupted gears of different effective amplitude and an operating gear for oscillating the driven spindle, and means for moving the operating gear into and out of engagement with the interrupted gears.

4. In a tapping attachment for boring machines, the combination with a driving spindle, of a driven spindle, mechanism comprising a pair of oppositely rotating countershafts provided with alternately acting interrupted gears of different effective amplitude operative in the same planes and an operating gear for oscillating the driven spindle, and means for moving the operating gear into and out of the planes of and engagement with the interrupted gears.

5. In a tapping attachment for boring machines, the combination with a driving spindle, of a driven spindle, mechanism comprising a pair of oppositely rotating countershafts provided with integral alternately acting interrupted gears of different effective amplitude and located between the shaft ends and an operating gear for oscillating the driven spindle, and means for moving the operating gear into and out of engagement with the interrupted gears.

6. In a tapping attachment for boring machines, the combination with a driving spindle, of a driven spindle, mechanism comprising a pair of oppositely rotating countershafts mounted in parallelism with said spindles and provided with alternately acting interrupted gears of different effective amplitude and an operating gear for oscillating the driven spindle, and means for moving the operating gear into and out of engagement with the interrupted gears.

7. In a tapping attachment for boring machines, the combination with a driving spindle, of a driven spindle, mechanism comprising a pair of oppositely rotating countershafts provided with alternately acting interrupted gears of different effective amplitude and an oscillatory operating gear splined to the driven spindle, and means for moving the operating gear into and out of engagement with the interrupted gears.

8. In a tapping attachment for boring machines, the combination with a driving spindle, of a driven spindle, mechanism comprising a pair of oppositely rotating countershafts provided with alternately acting interrupted gears of different effective amplitude and an operating gear for oscillating the driven spindle, one-way driving connections for said spindles, and means for shifting the operating gear from engagement with the interrupted gears into position to cause the operation of the one-way driving connections.

9. In a tapping attachment for boring machines, the combination with a driving spindle, of a driven spindle, mechanism comprising a pair of oppositely rotating countershafts provided with alternately acting interrupted gears of different effective amplitude and an operating gear for oscillating the driven spindle, one-way driving means comprising a clutch member driven by the driving spindle and a coöperating clutch member carried by the operating gear, and means for shifting the operating gear from engagement with the interrupted gears into position to cause the engagement of said clutch members.

10. In a tapping attachment for boring machines, the combination with a driving spindle, of a driven spindle, mechanism comprising a pair of oppositely rotating countershafts provided with alternately acting interrupted gears of different effective amplitude and an operating gear for oscillating the driven spindle, one-way driving connections comprising a clutch member carried by the driving spindle and a coöperating clutch member integral with the operating gear, and means for shifting the operating gear from engagement with the interrupted gears into position to cause the engagement of said clutch members.

11. In a tapping attachment for boring machines, the combination with a driving spindle, of a driven spindle, mechanism comprising a pair of oppositely rotating countershafts provided with alternately acting interrupted gears of different effective amplitude and an operating gear for oscillating the driven spindle, one-way driving connections comprising a clutch member carried by the driving spindle and a coöperating clutch member integral with the operating gear, means for shifting the operating gear from engagement with the interrupted gears into position to cause the engagement of said clutch members, and tap withdrawing means.

12. In a tapping attachment for boring machines, the combination with a driving spindle, of a driven spindle, mechanism comprising a pair of oppositely rotating countershafts provided with alternately acting interrupted gears of different effective amplitude and an operating gear for oscillating the driven spindle, and tap withdrawing means.

13. In a tapping attachment for boring machines, the combination with a driving spindle, of a driven spindle, mechanism comprising a pair of oppositely rotating countershafts provided with alternately acting interrupted gears of different effective amplitude and an operating gear for oscillating the driven spindle, and tap withdrawing means comprising a reverse running device having a clutch member formed thereon and a coöperating clutch member carried by the driven spindle.

14. In a tapping attachment for boring machines, the combination with a driven spindle having a plurality of members operative as splines and as clutch members, of means engaging said members when operating as splines for rotating the driven spindle in one direction, and additional means for engaging said members when operating as clutch members to reverse the rotation of said spindle to cause the withdrawal of a tap.

15. In a tapping attachment for boring machines, the combination with a driven spindle having a plurality of splines, of means engaging said splines for rotating the spindle in one direction, means for oscillating the spindle, selective means for controlling the oscillation or rotation of the spindle, and additional means for engaging said splines to reverse said spindle to cause the withdrawal of a tap.

16. In a tapping attachment for boring machines, the combination with a driven spindle having a plurality of splines, of means engaging said splines for rotating said spindle in one direction, reverse running means for engaging said splines to reverse the rotation of the spindle to cause the withdrawal of a tap, and means for maintaining a constant spaced relation between said rotating means and said reverse running means regardless of the position of the splines with respect to said means.

17. In a tapping attachment for boring machines, the combination with a driven spindle having a plurality of splines, of means engaging said splines for rotating the spindle in one direction, reverse running means for engaging said splines to reverse the rotation of said spindle to cause the withdrawal of a tap, and a double flanged yoke engaging said rotating means and said reverse running means.

18. In a tapping attachment for boring machines, the combination with a driven spindle having a plurality of splines, of means engaging said splines for rotating the spindle in one direction, reverse running means for engaging said splines to reverse the rotation of said spindle to cause the withdrawal of a tap, a double flanged yoke engaging said rotating means and said reverse running means, and means for shifting the position of the yoke.

19. In a tapping attachment for boring machines, the combination with a driven spindle having a plurality of splines, of gearing engaging said splines for rotating the spindle in one direction, reverse running gearing for engaging said splines to reverse the rotation of said spindle to cause the withdrawal of a tap, a double flanged yoke engaging said gearing, and means for shifting the position of the yoke.

In testimony whereof, I have signed my name to this specification.

JOHN F. HALSTEAD.

Copies of this patent may be obtained for five cents each, by addressing the "Commissioner of Patents, Washington, D. C."